3,806,415
THINNING AND SACCHARIFICATION OF STARCH
PASTES WITH GLUCOAMYLASE
Lester P. Hayes, Decatur, Ill., assignor to A. E. Staley
Manufacturing Company, Decatur, Ill.
No Drawing. Filed June 30, 1971, Ser. No. 158,625
Int. Cl. C12b 1/00
U.S. Cl. 195—31 R          16 Claims

ABSTRACT OF THE DISCLOSURE

Dextrose conversion syrups are obtained directly from starch pastes without requiring an acid and/or alpha amylase prethinning step. A substrate suitable for saccharification is obtained by initially treating a starch paste at a temperature in excess of 170° F. with glucoamylase. The paste containing the glucoamylase is then vigorously agitated and cooled to provide a hydrolyzate substrate suitable for direct saccharification to a dextrose conversion syrup.

BACKGROUND OF THE INVENTION

Prior to hydrolyzing an aqueous starch slurry to a conversion syrup with a saccharifying enzyme, it is conventional to gelatinize and thin the starch slurry. Gelatinization and thinning of the starch slurry is normally achieved by heating the aqueous slurry to a temperature above the gelatinization temperature of the starch and partially hydrolyzing the solubilized starch with either an acid or alpha amylase. Under conventional acid-enzyme thinning processes, an aqueous starch slurry is hydrolyzed and thinned at a pH of about 1.8 to about 2.5 under elevated temperatures and pressures to a D.E. of about 15 to 20. The thinned starch (often referred to as a liquified starch) is then normally cooled to a temperature of about 60° F. and neutralized to a pH conducive to the activity of the saccharifying enzyme. The saccharifying enzyme is then added and the saccharification is allowed to proceed until the desired syrup conversion level is achieved.

Due to several inherent problems arising from the partial hydrolysis or thinning of the aqueous starch slurries, the art has resorted to processing conditions wherein the partial hydrolysis and thinning steps are effectuated by alpha-amylase preparations (often referred to as an enzyme-enzyme process). The usual thinning procedure is accomplished by treating an aqueous starch slurry with an alpha amylase at a pH of about 5.5 to 7.0 at about 80 to 90° C. for one to three hours. After thinning, the thinning enzyme is normally thermally deactivated and the hydrolyzate is cooled to the enzymatic saccharification temperature as in the acid-enzyme process. Compared to an acid-enzyme process, the enzyme-enzyme process results in higher recoverable yields of sugar conversion products and a reduction in certain undesirable by-products such as ash, 5-hydroxymethylofurfural (HMF) and color imparting agents.

A major difficulty encountered by enzyme thinning techniques is the problem of avoiding starch retrogradation (often at a level of only about 1% or less). Conventional enzyme thinned starch hydrolyzates inherently possess a character highly conducive to the formation of retrograded starch hydrolyzates (e.g., water-insoluble, micro-crystalline particles which exhibit a beta-type X-ray defraction pattern). Thinned hydrolyzates which contain retrograded starch cannot be effectively hydrolyzed by glucoamylase preparations and converted into dextrose. As a result, the retrograded starch remains in the conversion syrup after completion of the saccharification thereof. Retrograded starch in a conversion syrup adversely effects its desired properties and significantly reduces its filterability.

Several means of avoiding starch retrogradation in the conversion syrup have been proposed by the art. In U.S. Pat. No. 3,378,462 by L. J. Denault et al., the patentees allege that the retrogradation problem is mitigated by conducting the alpha enzyme thinning in the presence of water-soluble calcium and sodium compounds preferably at temperatures of about 185 to 195° F. British Pat. No. 1,157,515 by K. Kroyer proposes to obviate the degradation problem by employing an initial partial acid hydrolysis step wherein the starch slurry is hydrolyzed to a D.E. of not more than 10 (e.g., 5 minutes at 140° C. at a pH of 1.8–2.5). The partial acid hydrolyzate is then neutralized and rapidly cooled to an enzyme liquefication temperature and thinned.

Another suggested approach to obviate the degradation problem is to thin the starch with an enzyme, after which, the enzyme thinned hydrolyzate is subjected to boiling or autoclaving to resolubilize the insolubles therein. Saccharification is then completed by cooling the autoclaved or boiled hydrolyzate coupled with the addition of more enzyme to compensate for the thermally deactivated enzyme therein (e.g., see "Diastase 73" Tech. Bul. SP–254 (11/63), Rohm & Haas Company and Japanese Pat. No. 15,219 of 1964 by T. Iwazara et al.). In U.S. Pat. No. 3,280,006 by T. L. Hurst et al., it is proposed that the retrogradation problem can be obviated by heating a partial hydrolyzate containing alpha amylase to a temperature of 90°–100° C. to liquify substantially all of the starch followed by a thermal treatment in excess of 125° F. under pressure and subsequent saccharification thereof with amyloglucosidase. Canadian Pat. No. 753,-228 by A. L. Wilson proposes another means of obviating the degradation problem. Pursuant to the Canadian patent teaching, a starch slurry is pasted in a jet cooker at temperatures of 130°–160° F. Retrogradation of the pasted starch is allegedly prevented in the Canadian patent by diluting the pasted starch with a thinned and partially saccharified starch hydrolyzate. Pursuant to the Canadian patent, it is advantageous to rapidly cool the pasted starch prior to the dilution thereof although the dilution step may be employed as a means of rapidly cooling the pasted starch.

In British Pat. No. 1,086,206, there is disclosed a method for prethinning and saccharifying thinned hydrolyzates with *Aspergillus niger* at a pH of 3.0 to 5.0. The British patentees disclose that the prethinning step can alternatively be conducted by treating a cooled gelatinized starch slurry with the *Aspergillus niger* or simultaneously gelatinizing and thinning the starch slurry with *Aspergillus niger* at elevated temperatures. Although the British patent allegedly avoids the necessity of a pH adjustment after the thinning step as well as different and distinct enzymes for the thinning and saccharification steps, the disclosed method fails to solve major problems relative to successful conversion of aqueous starch slurries into dextrose containing syrups. Although the British patent process allegedly provides high dextrose yields (e.g., 96.5–98.4), the resultant conversion product contains relatively high amounts of insolubles (e.g., about 2% or more of insoluble solid). Successful prethinning and saccharification pursuant to the British Patent is apparently dependent upon the use of a glucoamylase preparation having a relatively high degree of alpha amylase activity (e.g., a glucoamylase to alpha activity ratio of at least about 75:8 or more). The thinning saccharification enzyme requirements as well as the thinning rate are adversely effected by the disclosed thinning procedure.

OBJECTS

It is an object of the present invention to provide an improved method for thinning starch with glucoamylase preparations under conditions wherein the amount of insoluble and insoluble precursors are maintained at a minimum or negligible level.

Another object of the invention is to provide dextrose conversion syrups which are readily filterable and recoverable.

A further object of the invention is to utilize glucoamylase preparations as a means of providing a thinned hydrolyzate which can be directly saccharified into a high dextrose conversion syrup without requiring a preliminary acid and/or alpha amylase prethinning step.

A still further object of the present invention is to accelerate the rate of providing a thinned hydrolyzate substrate suitably adapted to be saccharified into a dextrose conversion syrup.

An additional object of the present invention is to provide a method for preparing conversion syrups of a high dextrose content.

DESCRIPTION OF THE INVENTION

According to the present invention, there is provided a method for preparing conversion syrups containing dextrose as a principal solid constituent said method comprising the steps of:

(a) providing a starch paste from an aqueous slurry containing at least 20% by weight starch solids at a pH ranging from about 3.5 to about 9.0, by heating the slurry under superatmospheric conditions to a temperature of at least 250° F. for a period of time and under conditions sufficient to provide a starch paste characterized as being essentially free from insoluble starch granules and having a D.E. of less than 2.0, (b) initially treating the starch paste at a temperature of at least 170° F. to about 210° F. with an effective amount of a glucoamylase preparation sufficient to substantially reduce the viscosity of said paste, (c) hydrolyzing the starch by vigorously agitating and cooling the treated starch paste to a temperature of less than about 150° F. with the period of time between initial treatment of the starch paste by the glucoamylase preparation and cooling thereof to a temperature less than about 150° F. ranging from about 3 to about 40 minutes, and (d) saccharifying the starch hydrolyzate under conditions and for a period of time sufficient to provide a conversion syrup which contains on a hydrolyzate solids weight basis dextrose as a principal hydrolyzate constituent.

The thinning method of the present invention provides a means of maintaining the amount of retrograded starch during the thinning and subsequent saccharification thereof at a nominal and/or essentially non-retrograded level. As as result, conversion syrups essentially free from retrograded starch and having a high filtration rate may be prepared from the glucoamylase thinned hydrolyzates herein.

The method of the present invention also provides a means for significantly reducing the necessary time to provide a thinned hydrolyzate suitable for saccharification. Since the present method utilizes a glucoamylase preparation as a means of thinning the starch paste, the present invention affords a means of direct dextrose saccharification with glucoamylase without requiring a preliminary acid and/or alpha amylase prethinning step. Thus, the glucoamylase preparation utilized in thinning the starch paste may be retained to further saccharify the resultant hydrolyzate to dextrose. Undesirable contaminants normally saccharified in prethinning processes with alpha amylase and/or acid thinning are substantially eliminated by the starch present invention. The thinned hydrolyzates herein are easily obtainable from aqueous starch slurries of the high solids content (e.g., 20% to about 40% by weight solids) without necessitating dilution or concentration of the solids content thereof. The thinned hydrolyzate prepared in accordance with the invention provide a saccharified product of improved quality and yields. Unlike the acid enzyme processes, the method of the present invention provides a means for obtaining high recoverable yields of sugar conversion products without concomitant undesirable by-products such as HMF, ash, color imparting agents, and the like. Dextrose conversion products essentially free from retrograded starch of a predetermined dextrose content are thus provided by the present invention.

Starch paste preparation

An essential embodiment of the present invention is to sufficiently alter the starch granules within the aqueous slurry so that the resultant starch paste can be effectively thinned and saccharified by glucoamylase preparations. In general, significant alteration and transformation of the starch granules is achieved by heating an aqueous starch slurry to a temperature of at least 250° F. under superatmospheric conditions. It has been found that if an aqueous starch slurry is merely heated to a temperature above its gelation point under atmospheric conditions, the resultant starch paste cannot be effectively thinned and saccharified solely by glucoamylase preparations. Apparently, heating of aqueous starch slurries to a temperature of at least 250° F. in the presence of excess steam and pressure effectively destroys the structural identity of starch particles and thus provides a substrate highly susceptible to glucoamylase hydrolysis.

The appropriate temperature, pressure and period of treatment to provide the starch pastes may be obtained by processing aqueous starch slurries in an apparatus commonly known to the art as steam injection heaters or jet cookers. In such apparatus, superatmospheric steam is injected and mixed with a water slurry of starch granules in a throat section of a jet. Upon contact with the injected steam, the starch granules are uniformly and thermally treated under turbulent conditions whereupon the starch granules are gelatinized and solubilized.

Illustrative steam injection heaters wherein the pressures, temperatures and feed rates can be regulated to provide the desired starch pastes are disclosed in U.S. Pats. Nos. 2,805,995; 3,197,337; 3,219,483 and 3,133,836. More uniformly solubilized starch pastes are obtained by use of the steam injection heater in combination with a holding zone such as coiled tubing or a pressurized tank constructed to minimize liquid channelling. Other thinning apparatus (e.g., heat exchangers, homogenizer cookers, votators, sizeometer cookers, kettle cookers, etc.) may be employed provided the treatment and processing conditions are adequately controlled.

The processing conditions necessary to provide a starch paste suitable for initial treatment with a glucoamylase preparation will depend largely upon the solids content, the starch character and pH of the aqueous slurry as well as other factors such as the pressure, temperature and amount of turbulence employed in preparing the starch paste. Starch pastes exhibiting improved hydrolyzation characteristics with glucoamylase preparation are generally achieved in steam injection heaters which are operated at elevated temperatures ranging from about 275° F. to about 375° F. at about 45 p.s.i. to about 145 p.s.i. (absolute) preferably between about 310° F. to about 340° F. at absolute pressures of about 75 p.s.i. to about 100 p.s.i.

The starch paste hydrolyzate properties are generally enhanced when the resultant product obtained from a steam injection heater is subjected to further treatment at elevated temperatures and pressures in a retention zone. In general, maintaining the resultant product at a temperature of at least 250° F. under superatomspheric pressure conditions for a period of time of about at least 0.5 minute (after the steam injection heat treatment), will significantly improve its susceptibility to effective enzymolysis with glucoamylase preparations.

In most commercial adaptations of the present invention, it is advantageous to maintain the pressure and temperature of the retention zone at substantially the same level as that of the steam injection heater. Under such conditions, the aqueous starch slurry is suitably treated within the steam injection heater and directly conducted into the retention zone. The period of time the treated starch is maintained in the retention zone will depend largely upon the type of equipment employed. Retention zones adapted for a continuous flow (e.g., a retention pipe) are generally programmed to provide a residence time of about 1 to 5 minutes. Batch type retention zones (e.g., pressurized receiving tanks) are usually programmed to provide a longer residence time (e.g., 30 minutes or more). A relatively long period of residence within the retention zone will not have a deleterious effect upon the starch paste provided its D.E. is not substantially increased to a value of more than 2.0.

The hydrolysis of the starch paste with glucoamylase is further enhanced when the treated starch is expelled from the retention zone with excess steam through an orifice into an area of a substantially reduced pressure. A suitable means of accomplishing this effect is to expel the starch paste with excess steam through an orifice into a zone maintained at ambient pressures and temperatures and thereby flash cool the paste. The excess steam, high shear through an orifice coupled with the flash cooling (usually to about 200°–212° F.), effectively reduces the starch paste viscosity and preconditions the starch paste against subsequent retrogradation.

The viscosity of the resultant paste (as determined in Brookfield viscometer at 150° F., 20 r.p.m. with a No. 1 spindle) is an indicia of its functionality and susceptibility to glucoamylase enzymolysis when subjected to hydrolysis. A starch paste viscosity will normally increase proportionally with its starch solids content. On an equivalent solids content basis, it has generally been found that starch pastes with a lower viscosity possess significantly superior functionality than those starch pastes of a more viscose character. Starch pastes evincing excessively high viscosities are inherently more susceptible to starch retrogradation which in turn will significantly reduce both the effectiveness of the glucoamylase enzymolysis, dextrose yields and desired conversion syrup properties.

In general, the starch preparation step should be conducted under process conditions sufficient to provide a starch paste having a viscosity of less than 15,000 cps. without hydrolyzing the starch paste to a D.E. of greater than 2.0. Improved processing ease, dextrose yields, and conversion syrups are obtained when the starch paste has a viscosity of less than 10,000 cps. with further improvements being achieved by using starch paste having a viscosity of less than 15,000 cps. and a D.E. of less than 1.0. The preferred starch paste viscosities for practicing the present invention are within the range of about 500 cps. to about 2,500 cps. and a D.E. of less than about 0.5.

The aqueous slurries utilized in the present invention may be derived from a variety of sources including substantially pure starches and crude starch containing materials. Thus, purified and crude starches from corn, wheat, potato, sago, milo, sweet potato, tapioca, sorghum, rice, bean, oats, arrow root, barley, mixtures thereof and the like may be employed. Likewise, various fractions from both wet and dry milling processes such as starch liquors, ground whole wheat, corn flours, brewers grit, air classified wheat and starch products, wet cereal milling fractions such as centrifuged steams, clarified underflows and degermed mill stream slurries may be used. Essentially pure commercial preparation of unmodified starch granules (for example, unmodified corn starch granules) are particularly useful. Conventional aqueous starch slurries having the appropriate pH, starch solids content (e.g., 5 to 50% by weight starch solids) and uniformity are a suitable starting material. Advantageously, starch sluries containing at least 20% by weight and preferably between about 25% to about 35% by weight starch are employed.

In preparing the starch pastes herein, an aqueous starch slurry having a pH of about 3.5 to about 9 is subjected to a temperature of at least 250° F. under superatmospheric conditions for a period of time and under conditions sufficient to provide a starch paste having a D.E. of less than 2.0 and essentially free from starch granules. Pressures, temperatures, pH and other processing conditions which are either too severe or too mild to provide such a starch paste (e.g., D.E. greater than 2 and/or contaminated with insoluble starch granules) inherently provide a starch paste highly susceptible to subsequent retrogradation under the processing conditions of the present invention.

Aqueous slurries having a relatively low solids content and pH, generally require less severe process conditions than those slurries of a higher solids and a more neutral pH. Advantageously, the aqueous starch slurries are pasted at a pH ranging from about 4.0 to about 7.5. Improved processing and paste performances are achieved by subjecting aqueous slurries having a pH of about 4.5 to about 6.5 to process conditions wherein the resultant starch paste has a D.E. of less than 1.0 and preferably less than 0.5 (e.g., about 0.05 to about 0.4).

Initial hydrolysis of the paste with glucoamylase

The starch pastes prepared in accordance with the present invention are initially hydrolyzed by treating the starch paste with a glucoamylase preparation at a temperature of at least 170° F. to about 210° F. It has been found that when the starch paste is initially treated with an effective amount of a glucoamylase preparation at a temperature of at least 170° F., the rate of hydrolysis proceeds rapidly with a concomitant substantial reduction in hydrolyzate medium viscosity. An essential embodiment of the present invention is to initially treat the starch paste with a glucoamylase preparation at a temperature of at least 170° F. Initial treatment at temperatures below 170° F. provide starch paste hydrolyzates inherently susceptible to starch retrogradation. The presence of retrograded starch particles in improperly treated starch pastes is not readily apparent at relatively high temperatures (e.g., above 160° F.).

However, upon further cooling, the resultant hydrolyzed product of improperly treated starch pastes evince a significant amount of retrograded starch (e.g., 1–2% or more). By initially treating the starch paste with a glucoamylase preparation at a temperature of at least 170° F. the glucoamylase preparation can effectively hydrolyze the starch and convert the resultant hydrolyzate into dextrose without a concomitant development of retrograded starch.

Glucoamylase preparations are generally recognized in the art as being relatively unstable and easily inactivated when exposed to elevated temperatures. Glucoamylase preparations which are merely introduced into the starch paste at elevated temperatures without further processing conditions to aid the hydrolysis of the starch paste or to maximize the gluoamylase hydrolyzate activity should be avoided. Initial treatment of the starch paste with a glucoamylase preparation at a temperature within the range of about 175° F. to about 185° F. are generally most suitable in practicing the present invention. After initial glucoamylase treatment of the paste, the resultant medium may be cooled to a temperature below 170° F. in a relatively short period of time (e.g., within about a half minute to about 5 minutes). Initial treatment at higher temperatures are generally cooled more rapidly than initial treatments at a somewhat lower temperature.

Glucoamylase thermal inactivation and the formation of retrograded starch particles are substantially reduced by subjecting the glucoamylase preparations and starch paste to a high degree of turbulence. Under relatively quiescent conditions, substantial glucoamylase inactivation and starch retrogradation will occur. The combined effect of turbulent conditions plus active and rapid hydrolysis of the starch paste at the elevated temperatures apparently significantly reduces the intermolecular association of the starch molecules and thus inhibits starch retrogradation. Thus, pursuant to the present invention, both the glucoamylase requirements and character of the resultant hydrolyzate (e.g., the substantial absence of retrograded starch) are significantly improved by maintaining the starch paste and added glucoamylase in a turbulent state during the hydrolysis thereof at elevated temperatures. Turbulent conditions for maintaining uniform distribution and continual contact of the glucoamylase with the starch paste during the initial hydrolyzate can be achieved by conventional agitation means. Illustrative apparatus for vigorously agitating the starch paste and hydrolyzate medium include high shear blenders, turbulizers, pressure pumps operatively connected to baffled discharge pipes, flash cooling devices, scraped surface heat exchangers, and the like. The apparatus is advantageously equipped with cooling means whereby the hydrolyzate medium is simultaneously agitated and cooled to a temperature of less than about 150° F.

At a temperature of 150° F.–210° F., the rate of starch hydrolysis proceeds rapidly as evidenced by a substantial reduction in viscosity. Within less than an hour, the resultant hydrolyzate can be cooled to a temperature below 150° F. and saccharified to the desired dextrose conversion product. The period of time necessary to provide a suitable hydrolyzate substrate depends primarily upon starch solids content, potency of the glucoamylase preparation and temperatures at which the hydrolysis thereof is conducted. By carefully programming of the cooling rate coupled with vigorous agitation, a sufficiently hydrolyzed pastes suitable for saccharification can be easily obtained within about 3 to about 40 minutes. Improved processing and hydrolyzate substrate properties are achieved by allowing the hydrolysis to continue at temperatures in excess of 150° F. for a period of time ranging from about 5 to about 15 minutes.

In general, at least a major portion of the total glucoamylase preparation process requirements are incorporated into the starch paste prior to cooling the hydrolyzate to a temperature below 150° F. with more than 25% thereof being initially added at a temperature of at least 170° F. The total glucoamylase requirements will depend largely upon the desired dextrose content of the conversion syrup and the desired rate of conversion. Initial treatment of the starch paste at temperatures above 170° F. with a least a major portion of the total glucosamylase preparation requirements will significantly improve the resultant hydrolyzate properties comparative to those hydrolyzates prepared with a lesser amount of glucoamylase. Advantageously at least 75% and preferably substantially all (e.g., 95% or more) of the total glucoamylase preparation requirements are added to the starch paste at temperatures above 170° F.

The total requirements of glucoamylase preparation used to provide the hydrolyzed substrate and its saccharification to a dextrose conversion syrup will depend on a multiplicity of factors. Illustrative factors include (1) potency of the glucoamylase preparation, (2) process conditions used in providing the substrate prior to saccharification and for the saccharification thereof (e.g., pH, time-temperature, agitation, starch solids content, etc.), (3) desired rate for production of the paste hydrolyzate and conversion syrup and (4) desired dextrose content of the resultant conversion syrup product. The potency of a glucoamylase preparation is usually expressed in units of activity with one unit being defined as the amount of enzyme which will convert 100 mg. of starch essentially to dextrose in 48 hours at 60° F. employing the optimum pH conditions of the glucoamylase preparation (standard tests normally employ 4.0 pH).

In preparing dextrose conversion syrups containing a dextrose solid content of 80% of weight or more, the glucoamylase preparation requirements are generally more than about 500 units of glucoamylase preparation for each 100 grams of starch paste solids. Lesser units of glucoamylase may be employed if it is desired to prepare a conversion syrup of a lower D.E. and dextrose content. The total glucoamylase requirements used in the present invention are normally greater than that used in conventional dextrose saccharification processes (e.g., about 1.25 to about 2.5 times more) because of the paste hydrolyzate step herein. When it is desired to produce a conversion syrup having a dextrose content in excess of 90% by weight, the total glucoamylase requirements normally range from about 750 units to about 3,000 units with about 1,500 to about 2,500 glucoamylase units being used for conversion syrups having a dextrose content of about 947 to about 97% by weight.

The method of the present invention is adaptable to a broad spectrum of glucoamylase preparations. Any glucoamylase preparation capable of saccharifying conventional acid or alpha amylase thinned hydrolyzate to dextrose may be employed. Illustrative glucoamylase preparation (often referred to as amyloglucosidase) include glucoamylase preparations of the Aspergillus (e.g., *Aspergillus niger, Aspergillus awamori, Aspergillus usamii, Aspergillus oryzae*, etc.), Clostridium (e.g., *Clostridium acetobutylium*, etc.), Rhizopus (e.g., *Rhizopus delemar, Rhizopus tonkinensis*), Saccharomyces (e.g., *Saccharomyces diastaticus*, etc.), Neurospora sp., Monascus (e.g., *Monascus purpureus*), *Endomyces genera*, mixtures thereof and the like. Particularly suitable are those glucoamylase preparations which have been refined or modified to alter the transglucosidase activity. Typical glucoamylase preparations which retard transglucosidase activity are disclosed in U.S. Pats. Nos. 2,881,115; 2,893,921; 3,012,944; 2,967,805; 2,970,086; 3,329,578; 3,197,338; 3,137,639; 3,067,108; 3,303,102; 3,047,471; 3,039,936; 2,967,804; etc. If desired, other enzymes such as amylo-1,6-glucosidase (e.g., R-enzymes, isoamylase, pullulanase, etc.) may be utilized to facilitate the hydrolysis of the starch paste and its conversion to dextrose.

Glucoamylase preparations exhibiting a relatively high degree of alpha amylase activity are not required to hydrolyze the starch paste to a hydrolyzate substrate suitable for glucoamylase saccharification to a dextrose syrup. Accordingly, the initial starch hydrolysis can effectively utilize those glucoamylase preparations exhibiting a high glucoamylase unit activity and a low alpha amylase unit activity.[1] Glucoamylase preparations having a ratio of 75 glucoamylase units to about 5 units of alpha amylase activity or less are suitable in hydrolyzing the starch paste. Thus, the invention affords the method of initially treating an aqueous starch paste with a glucoamylase preparation substantially free from alpha amylase activity (e.g., having a glucoamylase to alpha amylase unit activity ratio ranging from a trace activity to about 75:1) and directly saccharifying the starch paste to a dextrose conversion syrup without adversely effecting the syrup quality or its filtration characteristics.

In general, the pH of the starch paste is adjusted to the optimum pH values for the particular glucoamylase preparation employed. Typical optimum pH values for glucoamylase preparations usually range from about 3.8 to about 5.0 and primarily within the range of about 4 to 4.5. The process conditions in hydrolyzing the starch pastes should be sufficient so that the resultant paste hydrolyzate neither possesses a blue or purple color when subjected to the standard iodine tests. Blue or purple iodine test indicates the presence of substantial amounts of insoluble starch (e.g., insoluble starch granules and/or retrograded

---

[1] Alpha amylase activity ascertained pursuant to a publication entitled, "Test Methods for Determining Diastatic Activity," Booklet T 40b, Revised May 1962 by Rohm & Haas Co., Philadelphia, Pa.

starch) which in turn adversely effects the filterability and characteristics of the conversion syrups prepared herein. Comparative to those hydrolyzates which exhibit a blue or purple color, the rate of filterability of conversion syrups prepared from thinned hydrolyzates of a red or brown color (preferably at least brown) are significantly greater than those of the blue or purple color. The starch paste hydrolyzates herein, processed under conditions whereby the resultant hydrolyzate has a yellow starch iodine test color provide conversion syrups of unexpectedly superior properties.

SACCHARIFICATION OF THE PASTE HYDROLYZATES

After completion of the starch paste hydrolysis with the glucoamylase preparation, the resultant hydrolyzate is saccharified under conditions and for a period of time sufficient to provide a conversion syrup containing dextrose as a principal hydrolyzate solid constituent.

The saccharification of the paste hydrolyzates is generally conducted in a manner similar to conventional saccharification of acid or alpha amylase thinned hydrolyzate to dextrose conversion syrups. Usually the saccharification pH's are comparable to those utilized in the starch paste hydrolyzate preparations. Illustrative saccharifying pH's range from about 3.8 to about 5.0 (and most generally from about 4.0 to 4.5). Supplemental amounts of glucoamylase may be added to facilitate the dextrose conversion. Saccharification temperatures (depending upon the glucoamylase preparation) will normally range from about 120° F. to 150° F. with the optimum temperatures for most glucoamylase preparations being at about 130 to 145° F. Under the appropriate conditions, the desired dextrose conversion product can be achieved within a period ranging from about 30 to 100 hours with the conversion usually being completed within about 60 to 80 hours.

EXAMPLE 1

(A) Starch paste preparation

A starch slurry comprised of 74 parts by weight water and 26 parts by weight unmodified corn starch (pearl starch) was prepared. The pH of the slurry was adjusted to 5.5 with 3.0 molar calcium hydroxide. The aqueous slurry was then pumped into a steam injection heater of the type disclosed in U.S. Pat. 3,101,284, maintained at 325° F. and 96 p.s.i. (absolute) steam pressure. The resultant starch paste was collected in a 3" diameter tailpipe assembly, a retention zone, operatively connected to the steam injecter heater and adapted to maintain the paste therein at substantially the same pressure and temperature employed in the heater. The tailpipe assembly was vertically inclined at about a 45° angle and provided with a ball valve in the lower portion of the tailpipe assembly and in close proximity to the entry point of the paste from the steam injection heater. After 5 minutes retention time in the tailpipe assembly, excess steam was introduced into the tailpipe assembly chamber through a ball valve from a steam source maintained at a pressure higher than that of the steam injection heater. The excess steam expelled the starch paste at a high velocity through a pressure regulation valve whereupon the paste was flash cooled to a temperature of about 208° F. The resultant paste had a dextrose equivalent of less than 0.5 [2] and a viscosity of 1400 cps.[3]

(B) Starch paste hydrolyzate preparation

The flash cooled starch paste was then adjusted to a pH of 4.0 with dilute hydrochloric acid and transferred to a water-jacketed mixing vessel maintained at 160° F. While vigorously agitating the paste with a high speed mixer at 12,000 r.p.m.'s with a high shear and high lift mixing blade, the starch paste was allowed to cool. When the starch paste had been cooled to about 175° F., it was initially treated with 2,000 units of glucoamylase preparation for each 100 grams of starch paste solids.[4]

Hydrolysis of the paste was allowed to continue under vigorous agitation. After initiating the hydrolysis with the glucoamylase preparation, the viscosity of the paste began to decrease rapidly. Within less than about 5 minutes, the starch paste had cooled to less than 170° F. By regulating the temperature of the water coolant, the hydrolysis was allowed to proceed under vigorous agitation conditions such that at about 10 minutes after the initial glucoamylase treatment, the hydrolyzate had been cooled to a temperature of less than about 150° F.

(C) Preparation of the dextrose conversion syrup

The cooled paste hydrolyzate was then saccharified in a conventional dextrose fermenter at 140° F. and pH 4.0 for 72 hours. The resultant conversion syrup contained 97.4% by weight dextrose (on a dry weight solids basis) without any evidence of retrograded starch. The dextrose conversion syrup was then filtered through a conventional filter medium with the syrup product indicating a rapid rate of filtration. The filtered conversion syrup had an exceptionally high degree of clarity.

EXAMPLE 2

Employing the starch pasting apparatus and method of Example 1, starch pastes of diverse viscosities were prepared. Each starch paste sample was held in the retention zone for two minutes. Two runs (identified as Runs A and B) were prepared employing steam injection heater temperatures of 325° F. and 280 with pressures respectively of 96 p.s.i. and 49.5. In Runs A and B, excess steam pressure was used to expel the product from the retention zone chamber 1 through the regulating valve orifice. Runs C and D, respectively, corresponded to Runs A and B with the exception that these runs were not expelled from the retention zone with excess steam. Viscosities of the resultant starch pastes were determined for Runs A, B, C and D and found respectively to be 1,400 cps., 2,200 cps., 8,000 cps. and 76,000 cps.

The starch paste of Runs A–D were then subjected to the starch paste hydrolyzate preparation and dextrose conversion steps of Example 41. Runs A and B provided conversion syrups having significantly greater dextrose yields [5] comparative to the conversion syrups prepared from the pastes of Runs C and D (e.g., Runs A contained 97.4% dextrose as opposed to 94.6% dextrose for Run C). The conversion product derived from Run D exhibited an extremely poor rate of filterability and significant amount of retrograded starch.

The higher dextrose yields for the conversion syrups prepared from the stach pastes of Runs A and B was primarily due to the significantly lower viscosity which in turn permitted more uniform dispersion of enzyme and hydrolysis of the starch paste at temperatures in excess of 170° F. Apparently, the uses of excess steam coupled with additional high shearing effect of the regulating valve orifice upon the starch paste results in a substantial reductiin in paste viscosity without imparting a substantial increase in starch paste D.E.

For starch pastes exhibiting a relatively high viscosity (e.g., about 5,000–15,000 cps.), the vigorously agitation and simultaneous cooling of the hydrolyzate medium to a temperature of less than 150° F. may be suitably accomplished by a vertical scrapped surface heat exchanger.

Since many embodiments of this invention may be made and since many changes may be made in the embodiments

---

[2] Copper Test, Industrial Engineering Chemistry, Analytical Edition, vol. 13, page 616 (1941), Farley and Hixon.
[3] "Brookfield" viscosity at 150° F., 20 r.p.m. with a No. 1 spindle.
[4] Glucoamylase—75 (Novo Industri).
[5] Analytical method E-24 pursuant to Standard Analytical Method of the Member Companies of Corn Refiners, Inc., third edition, First Revision 52768.

I claim:

1. A method for preparing conversion syrups containing dextrose as a principal solid constituent, said method comprising the steps of:
   (a) providing a starch paste from an aqueous slurry containing at least 20% by weight starch solids, by heating the slurry at a pH ranging from about 3.5 to about 9.0 under superatmospheric conditions to a temperature of at least 250° F. for a period of time and under conditions sufficient to provide a starch paste having a D.E. of less than 2.0 and a viscosity of less that 15,000 cps.;
   (b) initially treating the starch paste at a temperature of at least 170° F. to about 210° F. with an effective amount of a glucoamylase preparation sufficient to substantially reduce the viscosity of said paste; and hydrolyzing the starch with glucoamylase by vigorously agitating and cooling the treated starch paste to a temperature of less than about 150° F. wherein the period of time between initial treatment of the starch paste with the glucoamylase preparation and cooling thereof to a temperature less than about 150° F. ranges about 3 to about 40 minutes; and
   (c) saccharifying the cooled starch hydrolyzate to dextrose with glucoamylase under conditions and for a period of time sufficient to provide a conversion syrup which contains dextrose as a principal solid constituent.

2. The method according to claim 1 wherein the pH of the starch of the aqueous slurry ranges from about 4.0 to about 7.5 and at least a major portion of the total glucoamylase preparation requirements is incorporated into the starch paste prior to cooling the hydrolyzate to a temperature below 150° with at least 25% of the total glucoamylase preparation requirements being introduced into the starch paste at a temperature of at least 170° F.

3. The method according to claim 2 wherein the starch paste initially treated with the glucoamylase preparation is characterized as having a D.E. of less than 1 and a viscosity of less than 10,000 cps.

4. The method according to claim 2 wherein at least 75% of the total glucoamylase preparation requirements are initially added to the starch paste at a temperature of at least 170° F. with the total glucoamylase requirements being more than about 500 units of glucoamylase for each 100 gms. of starch solids.

5. The process according to claim 4 wherein the starch paste is prepared under superatomspheric pressure at a temperature ranging from about 275° F. to about 375° F.

6. The method according to claim 5 wherein step (a) comprises gelatinizing the starch granules of the aqueous slurry by passing the aqueous slurry through a steam injection heater zone maintained at a temperature ranging from about 275° F. to about 375° F. and superatmospheric conditions, collecting the gelatinized slurry in a retention zone while maintaining the gelatinized slurry at a temperature from about 275° F. to about 375° F. and under superatmospheric conditions, retaining the gelatinized slurry in the retention zone for at least 0.5 minutes and expelling the gelatinized starch from the retention zone through an orifice with excess steam to provide a starch paste.

7. The method according to claim 6 wherein the steam injection heat zone and the retention zone are maintained at a temperature ranging from about 290° F. to about 325° F.

8. The method according to claim 7 wherein the starch paste is initially treated with a glucoamylase preparation having a glucoamylase to alpha-amylase activity ratio ranging from trace alpha-amylase activity to about 25:1.

9. The method according to claim 2 wherein the aqueous slurry contains from about 25 to about 50% by weight corn starch solids and from about 750 units to about 3000 units of glucoamylase for each 100 grams of starch solids are employed to provide a conversion syrup having a dextrose solids content in excess of 90% by weight.

10. The method according to claim 9 wherein the aqueous slurry has a pH of 4.5 to about 6.5 and the resultant paste has a D.E. of less than 1.0 and a viscosity of less than about 10,000 cps.

11. The method according to claim 10 wherein the starch paste is initially treated with substantially all of the glucoamylase preparation at a temperature within the range of about 175° F. to about 185° F.

12. The method according to claim 10 wherein the starch paste is initially treated with substantially all of the glucoamylase requirements at temperatures of at least 170° F. with a glucoamylase preparation having a glucoamylase activity to alpha-amylase activity ratio of the glucoamylase of at least 75:1.

13. The method according to claim 4 wherein prior to the saccharification step (c) the hydrolyzed starch is characterized as having a yellow color when subjected to the standard iodine test.

14. The method according to claim 13 wherein the starch paste initially treated with the glucoamylase preparation is characterized as having a viscosity ranging from about 500 to 5,000 cps. and the aqueous starch slurry consists essentially from about 25 to about 35% by weight corn starch solids.

15. The method according to claim 14 wherein the period of time between initial treatment of the starch paste with the glucoamylase preparation and cooling thereof to a temperature of less than about 150° F. ranges from about 5 to about 15 minutes.

16. The method according to claim 11 wherein the period of time between initial treatment of the starch paste with the glucoamylase preparation and cooling thereof to a temperature of less than about 150° F. ranges from about 3 to about 40 minutes, the dextrose content of the conversion syrup ranges from about 94 to about 97% by weight and the total glucoamylase requirements ranges from about 1500 to about 2500 units for each 100 grams of starch paste solids.

References Cited

UNITED STATES PATENTS

| | | | |
|---|---|---|---|
| 3,654,081 | 4/1972 | Vance et al. | 195—31 R |
| 3,337,414 | 8/1967 | Wilson | 195—31 R |

A. LOUIS MONACELL, Primary Examiner

T. G. WISEMAN, Assistant Examiner

U.S. Cl. X.R.

195—11

UNITED STATES PATENT OFFICE
CERTIFICATE OF CORRECTION

Patent No. 3,806,415　　　　　　　　　Dated　April 23, 1974

Inventor(s) Lester P. Hayes

It is certified that error appears in the above-identified patent and that said Letters Patent are hereby corrected as shown below:

Column 2, line 71; for "glucosamylase" read ---glucoamylase---
Column 3, bridging lines 54/55; for "As as" read ---As a---

Column 4, line 71; for "superatomspheric" read ---superatmospheric---

Column 6, line 1; for "sluries" read ---slurries---
Column 7, line 50; for "glucosamylase" read ---glucoamylase---

Column 8, line 2; for "80% of weight" read ---80% by weight---
Column 8, line 18; for "947" read ---94%---
Column 10, line 47; for "Example 41" read ---Example 1---
Column 10, line 56; for "stach" read ---starch---
Column 10, bridging lines 62/63; for "reductiin" read ---reduction---
Column 11, line 53; for "superatomspheric" read ---superatmospheric---

Signed and sealed this 19th day of November 1974.

(SEAL)
Attest:

McCOY M. GIBSON JR.　　　　　　　　C. MARSHALL DANN
Attesting Officer　　　　　　　　　　Commissioner of Patents